(12) United States Patent
Morgan et al.

(10) Patent No.: US 11,121,535 B1
(45) Date of Patent: Sep. 14, 2021

(54) COMPOSITE LIGHTNING STRIKE PROTECTION SYSTEM

(71) Applicants: Dwayne R. Morgan, Wheeling, WV (US); Brian L. Gordon, Wheeling, WV (US); Neven W. Cook, Wheeling, WV (US)

(72) Inventors: Dwayne R. Morgan, Wheeling, WV (US); Brian L. Gordon, Wheeling, WV (US); Neven W. Cook, Wheeling, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 0 days.

(21) Appl. No.: 16/390,143

(22) Filed: Apr. 22, 2019

(51) Int. Cl.
| | |
|---|---|
| *B64D 45/02* | (2006.01) |
| *H02G 13/00* | (2006.01) |
| *H01B 1/02* | (2006.01) |
| *B32B 15/20* | (2006.01) |
| *B32B 15/04* | (2006.01) |
| *B32B 9/00* | (2006.01) |
| *B32B 5/02* | (2006.01) |
| *B32B 7/12* | (2006.01) |

(52) U.S. Cl.
CPC .............. *H02G 13/80* (2013.01); *B32B 5/028* (2013.01); *B32B 7/12* (2013.01); *B32B 9/007* (2013.01); *B32B 15/046* (2013.01); *B32B 15/20* (2013.01); *H01B 1/02* (2013.01); *B32B 2255/26* (2013.01); *B32B 2260/046* (2013.01); *B32B 2262/101* (2013.01); *B32B 2266/04* (2013.01); *B32B 2307/202* (2013.01); *B32B 2307/206* (2013.01); *B32B 2307/302* (2013.01)

(58) Field of Classification Search
CPC .............................. B64D 45/02; H02G 13/80
USPC ............................. 174/2; 244/1 A; 361/218
See application file for complete search history.

(56) References Cited

U.S. PATENT DOCUMENTS

| | | | |
|---|---|---|---|
| 8,378,208 B1* | 2/2013 | Bennett .................... | H01G 9/21 |
| | | | 136/236.1 |
| 2006/0027700 A1* | 2/2006 | Garrettson ............. | B64D 45/02 |
| | | | 244/1 A |
| 2009/0258220 A1* | 10/2009 | Schaaf ..................... | B32B 7/12 |
| | | | 428/332 |

OTHER PUBLICATIONS

Grujicic et al "Heat transfer and effective thermal conductivity analyses in carbon-based foams for use in thermal protection systems" Proc IMechE vol. 219 Part L: J. Materials: Design and Application, p. 217-230. (Year: 2003).*

* cited by examiner

*Primary Examiner* — Archene A Turner
(74) *Attorney, Agent, or Firm* — Philip D. Lane

(57) ABSTRACT

A porous metal and carbon composite lightning strike protection system is described that utilizes flexible metallic material and porous carbon. The carbon-based lightning strike protection system may be produced in the form of a panel that may be applied over the surface of an object to be protected or may be created directly over the surface of the object. The carbon-based lightning strike protection system is readily adaptable to high temperature applications.

10 Claims, 1 Drawing Sheet

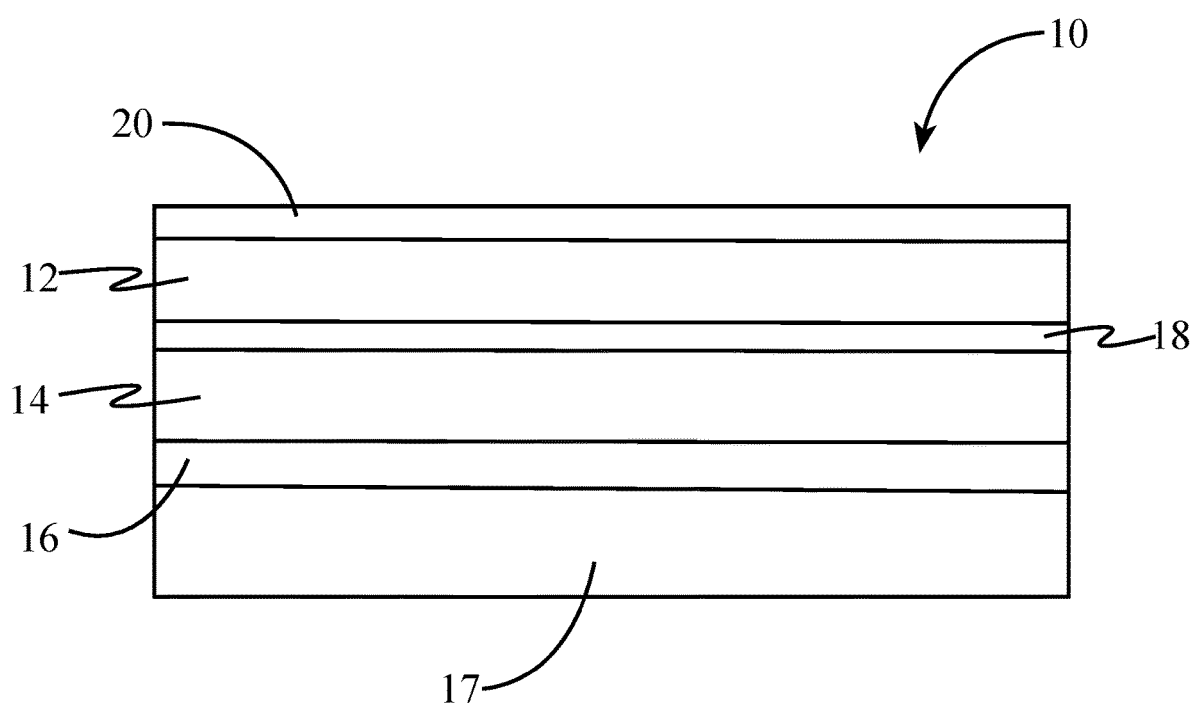

COMPOSITE LIGHTNING STRIKE PROTECTION SYSTEM

FIELD OF THE INVENTION

The present invention is directed to a composite lightning strike protection system that may be applied to the surface of an object such that the composite lightning strike protection system reduces damage to the object when subjected to a lightning strike.

SUMMARY OF THE INVENTION

The present invention includes a lightning strike protection system comprising a metallic spreader shield layer comprising a flexible metallic material, and a porous carbon thermal insulating layer comprising carbon foam having a thermal conductivity below about 0.5 W/mK, wherein the porous carbon thermal insulating layer is positioned between the metallic spreader shield layer and a surface of an object to be protected.

BRIEF DESCRIPTION OF THE DRAWINGS

FIG. 1 is a diagrammatic representation of the composite lightning strike protection system in accordance with an embodiment of the invention.

DETAILED DESCRIPTION OF EMBODIMENTS OF THE INVENTION

Some preferred embodiments of the present invention are described in this section in detail sufficient for one skilled in the art to practice the present invention without undue experimentation. It is to be understood, however, that the fact that a limited number of preferred embodiments are described in this section does not in any way limit the scope of the present invention as set forth in the claims.

It is to be understood that whenever a range of values is described herein, i.e. whether in this section or any other part of this patent document, that the range includes the end points and every point therebetween as if each and every such point had been expressly described. Unless otherwise stated, the words "about" and "substantially" as used herein are to be construed as meaning the normal measuring and/or fabrication limitations related to the value or condition which the word "about" or "substantially" modifies. Unless expressly stated otherwise, the term "embodiment" is used herein to mean an embodiment of the present invention.

The present invention is directed to a composite system that can mitigate lightning strike damage to an object. With reference to FIG. 1 there is illustrated a composite lightning strike protection system 10 in accordance with an embodiment of the invention. In general, the composite lightning strike protection system includes a metallic spreader shield layer 12 and a porous carbon thermal insulating layer 14 positioned between the metallic spreader shield layer 12 and the surface 16 of an object 17 to be protected.

The metallic spreader shield layer 12 is a layer made of flexible metallic material. In preferred embodiments, the flexible metallic material may include, but is not limited to copper, aluminum or alloys thereof. The flexible metallic material may be in the form of an expanded metal sheet, a perforated metal sheet, a welded wire mesh, or a woven wire mesh. The thickness of the metallic spreader shield layer 12 is preferably less than 1 mm, and may range from about 0.2 mm to about 1 mm. In some embodiments, a suitable flexible metallic includes, but is not limited to, copper or aluminum expanded metal foils.

A porous carbon thermal insulating layer 14 is positioned between the metallic spreader shield layer 12 and the surface 16 of an object to be protected. The porous carbon thermal insulating layer provides thermal insulating properties to protect the object from excessive heat. The porous carbon thermal insulating layer comprises a porous carbon material such as a carbon foam. Preferably, the porous carbon material exhibits a porosity of at least 80%, and in some embodiments of at least 90%. In preferred embodiments, the porous carbon thermal insulating layer exhibits a thermal conductivity below about 0.5 W/mK. The thickness of the porous carbon thermal insulating layer is not particularly limited and may be based on the particular application. In certain embodiments the thickness of the porous carbon thermal insulating layer ranges from about 0.2 to about 0.5 inches.

An adhesive layer 18 is used to adhere the metallic spreader shield layer 12 to the porous carbon thermal insulating layer 14. The adhesive used for the adhesive layer 18 depending on the expected temperatures the adhesive is expected to experience for the particular application. For high-temperature applications involving temperatures above the glass transition temperature of epoxy adhesive or other polymer resins, a graphite adhesive is preferable In some embodiments, a suitable graphite adhesive exhibits a use temperature of at least about 350 C, in further embodiments exhibits a use temperature of at least 1000 C, and still further exhibits a use temperature of at least about 2000 C. The use temperature is the temperature or range of temperatures at which the graphite adhesive substantially maintains its physical and chemical properties and continues to provide its function as an adhesive. For lower temperature applications, where the temperatures are less than 350 C, polymeric epoxies may be utilized.

It may be desirable to provide a cover layer 20 over the metallic spreader shield layer 12 to protect the metallic spreader shield layer from damage. In certain embodiments the cover layer may be a coating of a polymeric material or a layer of polymeric film. In preferred embodiments, the cover layer 20 may include but is not limited to, a carbon fiber reinforced prepreg or a glass fiber reinforced prepreg.

In the embodiment illustrated in FIG. 1, the composite lightning strike protection system 10 is in the form of a panel that may be applied to the surface of the object to be protected. The panel may be prepared ahead of time in the desired shape and form required and subsequently adhered to the surface of the object. In this way, objects may be easily retrofitted with the composite lightning strike protection system of the present invention. Alternatively, the composite lightning strike protection system may be applied and assembled directly on the surface of the object to be protected.

While several embodiments of the present invention have been shown and described, it will be obvious to those skilled in the art that many changes and modifications may be made thereunto without departing from the spirit and scope of the invention as described in the claims. All United States patents and patent applications, all foreign patents and patent applications, and all other documents identified herein are incorporated herein by reference as if set forth in full herein to the full extent permitted under the law.

What is claimed is:

1. A lightning strike protection system, comprising:
 a metallic spreader shield layer, wherein the metallic spreader shield layer comprises flexible metallic material; and a porous carbon thermal insulting layer comprising carbon foam having a thermal conductivity below about 0.5 W/mK and a thickness not greater than about 0.5 inches, wherein the porous carbon thermal insulating layer is positioned between the metallic spreader shield layer and a surface of an object to be protected.

2. The lightning strike protection system of claim 1, wherein the flexible metallic material is selected from the group consisting of copper and aluminum.

3. The lightning strike protection system of claim 1, wherein the flexible metallic material is in the form selected from the group consisting of expanded metal, perforated metal, welded wire mesh, and woven wire mesh.

4. The lightning strike protection system of claim 1, wherein the thickness of the metallic spreader shield layer is less than about 1 mm.

5. The lightning strike protection system of claim 1, further comprising an adhesive between the metallic spreader shield layer and the porous carbon insulating layer.

6. The lightning strike protection system of claim 5, wherein the adhesive is a graphite adhesive exhibits a use temperature of at least about 1000 C.

7. The lightning strike protection system of claim 5, wherein the adhesive is an epoxy adhesive.

8. The lightning strike protection system of claim 1, wherein the thickness of the flexible metallic material has a value ranging from about 0.25 mm to about 1 mm.

9. The lightning strike protection system of claim 1, further comprising a cover layer, wherein the metallic spreader shield layer is positioned between the cover and the porous carbon thermal insulating layer.

10. The lightning strike protection system of claim 2, wherein the cover layer is selected from the group consisting of carbon fiber prepregs and glass fiber prepregs.

* * * * *